Patented Dec. 5, 1944

2,364,589

UNITED STATES PATENT OFFICE 2,364,589

RUBBER HALIDE PLASTICS

James Wallace Raynolds and Milton R. Radcliffe, Easton, Pa., assignors to The Raolin Corporation, New York, N. Y., a corporation of West Virginia No Drawing. Application October 8, 1941, Serial No. 414,219

11 Claims. (Cl. 260—4)

This invention relates to rubber halide plastics; and it comprises a composition useful in making chemically-resistant articles of various kinds, including a rubber halide and a polymerized acrylate ester blended, usually with the aid of a mutually compatible plasticizer, as a homogeneous composition capable of giving clear films and molded or impregnated masses of good physical properties which exhibit great inertness to mineral and organic acids including food acids and to mineral and vegetable oils, as well as to most other reagents; the composition often containing modifying agents such as waxes or resins; all as more fully hereinafter set forth and as claimed.

Chlorinated rubber, made by reaction between rubber and chloride, generally has a chlorine content of 64 to 66 per cent or more. It is a valuable substance for forming protective films, as it is highly inert to many solvents: water, alkalies, salts and dilute acids and to alcohols and mineral oils. It is, however, softened and dissolved on prolonged contact with turpentine and certain other essential oils, and likewise with vegetable oils, which last disability rules out application of plain rubber chloride to many food-packaging uses.

Another rubber halide, chlorinated rubber hydrochloride, especially that with a chlorine content of between 42 and 52 per cent, has better resistance to vegetable oils than chlorinated rubber. But it too is adversely affected by vegetable oils under extreme conditions; on prolonged exposure and elevated temperatures.

Both these substances are, moreover rather brittle in mass, e. g. embodied as a coating film or molded article, and incorporation of a plasticizer is often necessary. Numerous plasticizers are available, but unfortunately they all seem to reduce still further the resistance of the rubber halide to vegetable oils and turpentine.

Another rubber halide, rubber hydrochloride, having a chlorine content of about 30 per cent, has better grease resistance than either rubber chloride or chlorinated rubber hydrochloride, but its field of use has been restricted by its excessive thermoplasticity and tendency to stretch.

Accordingly, rubber halides, despite their advantages, have found a rather limited application to articles where resistance to food oils and greases must be provided, coupled with good physical properties, as in food packaging, furniture finishes and implement handles.

The present invention is based on the discovery that the susceptibility of the rubber halides to certain vegetable oils, greases and essential oils is substantially eliminated by incorporating with the rubber halides suitable polymerized esters of the acrylate series. Plasticizers compatible with both constituents, as described more fully hereinbelow, are generally included; and the resulting homogeneously blended plastic and film-forming compositions are characterized by excellent resistance to greases and oils. Moreover, it has been demonstrated that the incorporation of the acrylate polymer in the rubber halide has substantially no adverse effect on the resistance to other reagents, including organic acids and alcohols; although the acrylate esters themselves, especially when plasticized, have rather poor resistance to organic acids and alcohols.

It should be understood that reference herein to "esters of the acrylate series," "acrylate polymer," "acrylate ester," etc., refer generically to the indicated compounds and modifications of methacrylic acid, as well as acrylic acid itself. The lower alkyl esters and certain of the lower ether esters of both these acids are useful in this invention, as described in more detail hereinbelow.

Esters of acrylic acid and of methacrylic acid are readily polymerized, as by heating in the presence of organic peroxides, to yield plastic bodies, which are thermoplastic and tough in character and have very good resistance to most inorganic reagents and to mineral oils. Some have good resistance to vegetable oils and turpentine. But they are rather quickly softened by organic acids and alcohols. This is especially true of plasticized acrylic ester films, as noted. However, when blended with rubber halides according to the invention this last disability, surprisingly enough, disappears.

Coating films, liners, molded or impregnated articles and other manufactures made from the compositions of the present invention exhibit excellent resistance to all foodstuffs, including acidic and alcoholic foods as well as greasy foods, and are free of the limitations noted for either the rubber halide or the acrylic ester component alone. They also have excellent physical properties. In the case of rubber hydrochloride, which already has a fairly high resistance to vegetable oils, an important function of the invention is to reduce the excessive thermoplasticity of this rubber halide while preserving all the desirable properties thereof.

One convenient way of preparing a homogeneous blend of rubber halide and polymerized acrylate ester, according to the invention, is by dissolving the rubber halide in the monomeric (liquid) form of the ester selected, and bringing about polymerization of the ester with the aid of an organic peroxide (benzoyl peroxide, for example) and heat. The product is soluble in various lacquer solvents and gives good clear films on evaporation of the solvent. In another way of blending, the halogenated rubber and the polymerized ester can be dissolved in a mutual solvent (e. g. ethyl acetate or toluol). Such a solution deposits on evaporation a film which is homogeneous and clear. If desired, the rubber halide and the ester can be compounded in their quasi-solid state by blending in a two-roller mill; a mutual plasticizer such as dibutyl phthalate advantageously being present during the blending treatment. The homogenized product can be dissolved in a mutual solvent, to form a coating composition, or it can be converted to a molding powder by incorporation of a suitable filler. Pigments, of course, can be added at any stage desired.

The proportion of the acrylic ester employed is relatively small, considering the composition as a whole; usually less than the amount of plasticizer present, which last may run 10 to 40 per cent of the total composition.

It is often desirable to include some wax in the composition when thin films are to be made, of which a very high resistance to moisture penetration is required. The wax exists in admixture with the other two homogeneously blended film-forming components (the rubber halide and the polymerized acrylic ester) and surprisingly low moisture transmission values are attained even with small amounts of wax—a per cent or so based on the film.

The best proportion of acrylic ester polymer to rubber halide depends on the type of halide and the type of ester. For example, using rubber chloride and methyl methacrylate: to attain good resistance to vegetable oils and organic acids, it is best to use such proportions that the final film, impregnation, shaped article. etc., contains at least 55 per cent chlorinated rubber, and at least 5 per cent methyl methacrylate, the balance being made up of plasticizers, wax, modifying resins, etc. With ethyl methacrylate, at least 10 per cent of this polymer and 60 per cent rubber chloride are desirable, and with the propyl polymer, the values are 12 and 65 per cent.

The lower molecular weight members of the acrylic ester series are thus found to be the more effective, for increasing the grease-resistance. The polymer of the next higher ester, butyl ester of methacrylic or acrylic acid, has little or no effect on the vegetable oil resistance of rubber halides, but its incorporation is often desirable to improve certain physical qualities of the composition. However, certain of the alkoxy compounds or ether esters are highly effective, though of greater molecular weight. Thus, the polymers of the methoxy ethyl, ethoxy ethyl, methoxy ethoxy ethyl, and ethoxy ethoxy ethyl esters of acrylic and methacrylic acids have an effectiveness in grease-proofing rubber halides which is comparable to that of the methyl and ethyl esters, while having molecular weights higher than the butyl ester. Such ether esters are included in the term "ester," as used herein.

In general, the lower the molecular weight of the chlorinated rubber, the higher is the proportion of ester required for a given degree of resistance to grease. In most cases, a rubber chloride of "1000 centipoise" specification gives best results with the proportions of polymerized acrylic ester mentioned above. The foregoing specification means that the viscosity of the rubber chloride, in 20 per cent solution in toluol, is 1000 centipoises at 25° C., and corresponds to a relatively high molecular weight rubber chloride.

In the case of chlorinated rubber hydrochloride, the methyl methacrylate polymer is the best to use. Compositions containing at least 5 per cent methyl methacrylate, and at least 80 per cent of this rubber halide, show excellent vegetable-oil resistance. The halide is compatible with the ethyl and the propyl polymers, in compositions containing not more than 25 and 15 per cent of the polymer, respectively, and such compositions are useful though not in such a wide range of applications as those made up with methyl methacrylate.

In the following table, data are presented on the resistance of films made according to the present invention, and films made from rubber chloride and from acrylic ester alone, under exposure to the several reagents, listed. The temperature during exposure was maintained at 50° C. and the figures are the number of days required for breakdown of the films. In the last two columns, MM means methyl methacrylate, and EM means ethyl methacrylate. The items ">15" still exhibited full resistance after the 15 days of the test.

*Table*

| Reagent | Rubber chloride (1000 cps.) | Methyl methacrylate | Ethyl methacrylate | Rubber chloride 10 MM 2 | Rubber chloride 10 EM 2 |
| --- | --- | --- | --- | --- | --- |
| Ethyl alcohol, 95% | >15 | 1 | 1 | >15 | >15 |
| Acetic acid, glacial | >15 | 1 | 1 | >15 | >15 |
| Cottonseed oil | 1 | >15 | >15 | >15 | >15 |
| Carbitol | >15 | 1 | 2 | >15 | >15 |

The composition of the present invention is especially useful for cap liners. In addition to being highly inert to foods, the film is very tough, yet flexible, enabling its use even in spot crown caps for beer bottles, etc. In such application, because of the great distortion to which the liner is subjected, and the high pressure due to gaseous beverages any coating not having extreme toughness and flexibility fails.

One typical composition according to the invention which has proved especially good in bottle cap liners for foods, including vegetable oils, has the formula (parts by weight):

| | |
| --- | --- |
| Chlorinated rubber (1000 cps.) | 25 |
| Methyl methacrylate | 5 |
| Methyl phthalyl ethyl glycollate | 2.5 |
| Chlorinated paraffin (39% comb. chlorine) | 7.5 |
| Wax, M. P. 150° F | 1 |
| Toluol | 59 |
| | 100 |

This is applied to paper, etc., and the solvent allowed to evaporate, leaving a dense, impermeable, coherent, inert film, strictly waterproof.

In the compositions of the present invention the plasticizer plays a rather more complex part than in the case of simple rubber halides. One important function is in producing a homogeneous blend and thereby a clear, homogeneous film. The best plasticizers for the present purposes are substances compatible with both the rubber halide and the acrylic ester polymer and more or less soluble or miscible with each of these components. Examples are chlorinated paraffin and chlorinated diphenyl. Solvent plasticizers which have only slight solubility for each component are very good; e. g., dicresyl ether of diethylene glycol, methyl phthalyl ethyl glycollate, butyl stearate and tricresyl phosphate. Plasticizers having a relatively strong solvent power for either the rubber halide or the acrylic ester are useful, but plasticizers like tributyl phosphate which have strong solvent power for both components are of less general utility, except sometimes in admixture with plasticizers of the types mentioned above, as there is a tendency for absorption therein of the vegetable oil, alcohol or organic acid, or other substance which is in contact with the film, resulting in breakdown of the film. Mixtures of these different kinds of plasticizers are useful in some cases.

Provided the minimum requirements as regards proportion of rubber halide, acrylic resin and plasticizer, as set forth above, are met, the balance of the composition can be modified over a wide range to meet particular needs. Resins can be incorporated, e. g., alkyd or modified alkyd resins, phenol aldehyde resins and urea aldehyde resins. As stated, use of waxes is of special utility in the present compositions, to increase resistance to moisture. A small amount of a sharp-melting paraffin wax fraction of melting point about 150° F. gives good results; say a per cent of wax based on the rubber halide component.

While the composition has been described with emphasis on its inertness to various solvents, it has other desirable properties which make it useful even when that particular property is not important. Films or masses made with it are very tough, and flexible to a useful degree, and they seem to have all the good qualities of plain chlorinated rubber or chlorinated rubber hydrochloride, including wet-resistance, fire-resistance and good electrical insulation properties. They are thermoplastic to a useful degree, and are well adapted for making self-sealing wrappers.

The composition of the present invention can be handled and put to use in a great many ways. Solutions thereof in suitable solvents can be used like paint or lacquers, to produce adherent, permanent coating films on wood, metal, paper, fabric, regenerated cellulose, leather, metal foil or indeed almost any supporting surface. These finishes are attractive. Such solutions can also be used to impregnate porous webs and the like for purposes of water-proofing, fire-proofing, and affording electrical insulation. Application to the material treated can be by spraying, brushing, roll-coating, dipping or other known means. The composition can be emulsified in water and the emulsion used in similar ways.

Similarly, the composition in plastic or quasi-solid form, either by itself or including fillers, pigments, etc., can be handled by molding and extrusion methods, to make all sorts of articles—knife handles, plates, films, trays, etc.

The composition can be embodied in a molding powder, by drying a mixture of the solution or emulsion with wood-flour, etc., or by working up the semi-solid preparation with wood-flour or like filler.

Some particularly useful applications are, as a coating for butter and cheese wrappers, as a coating on paper or foil to form heat-sealing wrappers, as a liner for cans or collapsible tubes, and in liners for jar-closures and bottle caps.

As noted hereinabove, the proportions of the constituents of the plastic and coating composition of this invention may be varied considerably. Generally the rubber halide, such as chlorinated rubber containing 65 per cent or more of combined chlorine, is the major permanent constituent and is present in a proportion of 55 per cent or more of the total, excluding volatile solvents. In some instances, the proportion is 80 per cent or more. The polymerized ester of the acrylate series is employed in a proportion of at least 5 per cent, on the total plastic, and may be as much as 30 per cent or more. Suitable plasticizers, as described hereinabove, may constitute as much as 40 per cent of the plastic mass, but are generally employed in smaller proportions, from 10 to 30 per cent by weight. Waxes, resins, and other modifying ingredients, when included in the composition, are generally employed in minor proportions.

What we claim is:

1. A composition for making chemically resistant coating films and massive bodies comprising at least 55% chlorinated rubber and a polymerization product of an ester of the class consisting of the methyl, ethyl, propyl and the methoxy and ethoxy substituted methyl, ethyl and propyl esters of methacrylic and acrylic acid in an amount of about 5 to 30%, the proportions being based on the total weight of the plastic mass and adding up to 100%, said composition being in homogeneous admixture and characterized by exhibiting, in films or masses made therefrom, high resistance to inorganic reagents and to mineral and vegetable oils, alcohols and organic acids.

2. The composition of claim 1 including a plasticizer which exerts a plasticizing effect on both the chlorinated rubber and the acrylate polymer.

3. The composition of claim 1, wherein the chlorinated rubber is a chlorinated rubber having a chlorine content of about 64 to 66%.

4. The composition of claim 1, wherein the chlorinated rubber is a chlorinated rubber of relatively high molecular weight, having a viscosity of about 1000 centipoises.

5. The composition of claim 1, wherein the chlorinated rubber is a chlorinated rubber hydrochloride.

6. The composition of claim 1, including a small amount of a wax, to enhance the water resistance thereof.

7. The composition of claim 1, wherein the said ester is methyl methacrylate.

8. The composition of claim 1, wherein the said ester is ethyl methacrylate.

9. The composition of claim 1, including a volatile solvent for both the chlorinated rubber and the polymerized ester in amount sufficient to dissolve all said compound and ester.

10. The composition of claim 1, including a plasticizer which is compatible with and is slightly soluble in both the chlorinated rubber and the polymerized ester.

11. A composition according to claim 1 including a plasticizer in amount of about 10 to 40%.

JAMES WALLACE RAYNOLDS.
MILTON R. RADCLIFFE.